(12) United States Patent
Wang et al.

(10) Patent No.: US 12,132,187 B2
(45) Date of Patent: Oct. 29, 2024

(54) HEAT MANAGEMENT SAFETY ENHANCED VEHICLE BATTERY PACK BASED ON NESTED LITHIUM ION BATTERIES

(71) Applicant: Nanjing Tech University, Nanjing (CN)

(72) Inventors: Zhirong Wang, Nanjing (CN); Jinlong Bai, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 523 days.

(21) Appl. No.: 17/524,927

(22) Filed: Nov. 12, 2021

(65) Prior Publication Data

US 2022/0153169 A1     May 19, 2022

(30) Foreign Application Priority Data

Nov. 14, 2020   (CN) .......................... 202011273892.4

(51) Int. Cl.
*H01M 10/658*   (2014.01)
*B60L 50/64*    (2019.01)
*B60L 58/26*    (2019.01)
*H01M 10/0525*  (2010.01)
*H01M 10/613*   (2014.01)
*H01M 10/617*   (2014.01)
(Continued)

(52) U.S. Cl.
CPC .......... *H01M 10/658* (2015.04); *B60L 50/64* (2019.02); *B60L 58/26* (2019.02); *H01M 10/0525* (2013.01); *H01M 10/613* (2015.04); *H01M 10/617* (2015.04); *H01M 10/625* (2015.04); *H01M 10/6556* (2015.04); *H01M 10/6557* (2015.04); *H01M 10/6563* (2015.04); *H01M 10/6567* (2015.04); *H01M 10/6568* (2015.04); *H01M 50/209* (2021.01); *H01M 50/507* (2021.01); *H01M 50/509* (2021.01); *H01M 2220/20* (2013.01)

(58) Field of Classification Search
None
See application file for complete search history.

(56) References Cited

U.S. PATENT DOCUMENTS

2,487,831 A * 11/1949 Rupp ................ H01M 10/0422
                                                          429/94
7,264,902 B2 * 9/2007 Horie ................ H01M 10/6557
                                                         429/304
(Continued)

*Primary Examiner* — Gregg Cantelmo
(74) *Attorney, Agent, or Firm* — Muncy, Geissler, Olds & Lowe, P.C.

(57) ABSTRACT

A heat management safety enhanced vehicle battery pack based on nested lithium ion batteries includes an insulating housing. K insulating positioning and connecting plates are arranged in the insulating housing along a vertical direction. The positioning and connecting plate on each layer includes the batteries in M rows and N columns to form battery pack units. All the battery pack units perform output alone or perform output after being connected in series or in parallel to form a battery pack. Each battery includes a metal shell and a cell filled in the shell. The shell includes an inner cylinder and an outer cylinder. The inner cylinder is located in a through hole in the center of the outer cylinder. A gap is formed between a side wall of the inner cylinder and a secondary outer wall of the outer cylinder. The cell includes an outer cell and an inner cell.

10 Claims, 9 Drawing Sheets

(51) Int. Cl.
    *H01M 10/625*     (2014.01)
    *H01M 10/6556*     (2014.01)
    *H01M 10/6557*     (2014.01)
    *H01M 10/6563*     (2014.01)
    *H01M 10/6567*     (2014.01)
    *H01M 10/6568*     (2014.01)
    *H01M 50/209*     (2021.01)
    *H01M 50/507*     (2021.01)
    *H01M 50/509*     (2021.01)

(56)     References Cited

U.S. PATENT DOCUMENTS

| | | | |
|---|---|---|---|
| 2001/0010878 A1* | 8/2001 | Nakanishi | H01M 10/617 |
| | | | 429/120 |
| 2006/0028170 A1* | 2/2006 | Izawa | H01M 10/6557 |
| | | | 320/107 |
| 2011/0135986 A1* | 6/2011 | Qiu | H01M 10/613 |
| | | | 429/158 |
| 2022/0158266 A1* | 5/2022 | Wang | H01M 10/0445 |

* cited by examiner

HEAT MANAGEMENT SAFETY ENHANCED VEHICLE BATTERY PACK BASED ON NESTED LITHIUM ION BATTERIES

TECHNICAL FIELD

The present invention belongs to the technical field of lithium ion battery grouping, in particular to a heat management safety enhanced vehicle battery pack based on nested lithium ion batteries.

BACKGROUND ART

Heat accumulation is easily caused by lithium ion batteries during charge/discharge and use due to their attributes, the heat may cause temperature rise of the batteries during work, and thus, the working performances and safety of the batteries are lowered. Particularly, when the lithium ion batteries are used as power sources for an electric vehicle, due to the stacking and centralization of the batteries, it is difficult to conduct heat, which more easily causes continuous temperature rise and temperature non-uniformity inside a battery pack, the continuous temperature rise will lower the stability of the batteries, and then, thermal runaway of the batteries will occur, thereby resulting in a series of accidents.

The lithium ion batteries show poor performances at low temperature, this is also why the battery life of the current electric vehicle is greatly shortened in winter. The lithium ion batteries are ideal batteries serving as power storage units of a pure electric vehicle, but their high-temperature and low-temperature performances are both poor, and an ambient temperature window required by the optimal performance is relatively small, which restricts the development of the electric vehicle to a certain extent. If the batteries work at low temperature for a long time, lithium deposition on negative poles inside the batteries will be caused, so that the stability and safety of the batteries of which the temperatures rise are lowered; and the lithium deposition extent will be widened with the prolonging of the working time of the batteries at low temperature, and thus, thermal runaway risks of the batteries are increased.

Main influence factors on the high-temperature performances of the batteries lie in that if the energy density of the battery pack of the electric vehicle is intended to be increased, the volume of a single battery is required to be larger and larger, so that the proportion of useless space is reduced. However, for the larger single battery, the distances from the centers to the surfaces of the batteries are longer, the heat accumulation problem caused when the batteries are charged/discharged and used is more serious, and the temperature non-uniformity inside the batteries is higher, which will lower the performances and safety of the batteries after the batteries are charged/discharged repeatedly, and then, the thicknesses of the batteries in the current vehicle battery pack are limited.

For meeting the heating demands of the current batteries at low temperature, a set of heating device has to exist in the battery pack to ensure that the batteries can be heated to an appropriate working temperature at low temperature. In order to reduce systems of a cooling system and a heating system, a heat management system of each vehicle manufacturer includes the two functions at the same time. However, the heating system itself still occupies the volume inside the battery pack, and both integration level and complexity of the heat management system are high due to more functions to be achieved, so that technical thresholds and machining requirements are very high, and then, the development of a lithium ion battery pack for a vehicle is obstructed.

SUMMARY OF THE INVENTION

The purpose of the present invention is to provide a heat management safety enhanced battery pack based on nested lithium ion batteries to solve the technical problems of low single battery energy, heat management difficulty, system complexity and relatively low safety performance of an existing lithium ion battery pack for a vehicle.

In order to achieve the above-mentioned purpose, the present invention adopts the specific technical solutions.

Provided is a heat management safety enhanced battery pack based on nested lithium ion batteries, including an insulating housing, wherein K insulating positioning and connecting plates are arranged in the insulating housing along a vertical direction, and the adjacent positioning and connecting plates are arranged in parallel and at equal intervals; the positioning and connecting plate on each layer is provided with nested lithium ion batteries in M rows and N columns to form a lithium ion battery matrix in which the M×N lithium ion batteries are connected in series or in parallel to form battery pack units; the battery pack units on all layers are capable of performing output alone or performing output after being connected in series or in parallel to form a battery pack, wherein K, M and N are all positive integers greater than or equal to 3;

each of the nested lithium ion batteries includes a metal shell and a cell filled in the shell; the shell includes an inner cylinder and an outer cylinder with each being of a cylindrical structure with a bottom and without a cover, wherein the outer cylinder includes an outer wall and a secondary outer wall, an end surface of the outer cylinder is annular, the inner cylinder is located in a through hole in the center of the outer cylinder, a first gap is formed between a side wall of the inner cylinder and the secondary outer wall of the outer cylinder, and the inside of the first gap is provided with a metal connecting rib plate by which the inner cylinder and the outer cylinder are fixedly connected into a whole and are conducted; and the cell includes an outer cell and an inner cell, the outer cell is filled into a cavity of the outer cylinder, and the inner cell is filled in a cavity of the inner cylinder; the lower end of the outer cell is connected and conducted to a bottom plate of the outer cylinder by an outer cell lower pole piece; a first battery protection assembly is arranged at an opening in the upper end of the outer cylinder, and the upper end of the outer cell is connected and conducted, by an outer cell upper pole piece, to an outer cell electrode cap arranged on the upper surface of the first battery protection assembly; the lower end of the inner cell is connected and conducted to a bottom plate of the inner cylinder by an inner cell lower pole piece; and a second battery protection assembly is arranged at an opening in the upper end of the inner cylinder, and the upper end of the inner cell is connected and conducted, by an inner cell upper pole piece, to an inner cell electrode cap arranged on the upper surface of the second battery protection assembly.

Further improvement lies in that the inner cylinder, the outer cylinder and the metal connecting rib plate of each of the nested lithium ion batteries are integrally formed, and therefore, the structural stability is good.

Further improvement lies in that the outer cylinder of each of the nested lithium ion batteries is a cylindrical or cubic shell.

Further preferably, if electrodes of the outer cell upper pole piece and the inner cell upper pole piece of each of the nested lithium ion batteries are the same, the outer cell is connected in parallel with the inner cell by the shell. After the outer cell and the inner cell are connected in series into a circuit by the shell, provided are the following three working states:
1) when two wiring terminals in the circuit are connected and conducted to the shell and the inner cell electrode cap respectively, the inner cell is in a working state, and the outer cell does not work;
2) when the two wiring terminals in the circuit are connected and conducted to the shell and the outer cell electrode cap respectively, the outer cell is in a working state, and the inner cell does not work; and
3) when on wiring terminal in the circuit is connected and conducted to the inner cell electrode cap and the outer cell electrode cap at the same time, and the other wiring terminal is connected and conducted to the shell, the outer cell and the inner cell work at the same time after being connected in parallel.

Further preferably, if the electrodes of the outer cell upper pole piece and the inner cell upper pole piece of each of the nested lithium ion batteries are different, the outer cell is connected in series with the inner cell by the shell. After the outer cell and the inner cell are connected in parallel into a circuit by the shell, provided are the following three working states:
1) when two wiring terminals in the circuit are connected and conducted to the shell and the inner cell electrode cap respectively, the inner cell is in a working state, and the outer cell does not work;
2) when the two wiring terminals in the circuit are connected and conducted to the shell and the outer cell electrode cap respectively, the outer cell is in a working state, and the inner cell does not work; and
3) when the two wiring terminals in the circuit are connected and conducted to the inner cell electrode cap and the outer cell electrode cap respectively at the same time, the outer cell and the inner cell work at the same time after being connected in series.

Further improvement lies in that M×N first through holes are formed in each of the positioning and connecting plates, an insulating limiting sleeve is nested into each of the first through holes, and each of the nested lithium ion batteries is snapped in a corresponding limiting sleeve; and an insulating isolation pad is arranged between the battery pack units on every two adjacent layers. Further improvement lies in that 2K limiting parts are fixedly arranged on the inner wall of the insulating housing, and the limiting parts are distributed, with every two forming a group, on the two opposite side walls of the insulating housing;
a groove is formed in each of the limiting parts along a length direction, and two ends of each of the positioning and connecting plates are snapped in the grooves of the corresponding group of limiting parts; and a flexible buffering cushion which is fixedly arranged is laid in the groove to wrap ends of the positioning and connecting plate; and
a plurality of second through holes are formed in each of the limiting parts, a plurality of third through holes are formed in two ends of each of the positioning and connecting plates respectively, each of the second through holes and a corresponding third through hole are coaxially arranged, and each bolt is inserted into a corresponding group of second through hole and third through hole and is connected with a nut to fasten the positioning and connecting plate and the corresponding limiting part.

Further improvement lies in that if the electrodes of the outer cell upper pole piece and the inner cell upper pole piece of each of the nested lithium ion batteries are different, the outer cell is connected in series with the inner cell by the shell:
1) the inner cell electrode caps of all the nested lithium ion batteries in each of the battery pack units are connected into a whole by a first current busbar, the outer cell electrode caps of all the nested lithium ion batteries are conne9cted into a whole by a second current busbar, and then, all the nested lithium ion batteries in the battery pack unit are connected in parallel; and a first current output pole is connected and conducted to the first current busbar, a second current output pole is connected and conducted to the second current busbar, and the first current output pole and the second outlet output pole are used as two poles for output after the batteries on the layer are connected in parallel; and
2) all the nested lithium ion batteries in each of the battery pack units are successively marked as $D_1$, $D_2$, $D_3$, $D_4$, $D_5$, . . . , $D_{M \times N-1}$ and $D_{M \times N}$ according to an arrangement order of the matrix, wherein the inner cell electrode cap of each of the nested lithium ion batteries is connected with one of the first current busbars, and the outer cell electrode cap thereof is connected with one of the second current busbars;
then, the first current busbar of $D_1$ is connected and conducted to the second current busbar of $D_2$; the first current busbar of $D_2$ is connected and conducted to the second current busbar of $D_3$; the first current busbar of $D_3$ is connected and conducted to the second current busbar of $D_4$; the first current busbar of $D_4$ is connected and conducted to the second current busbar of $D_5$; successive connection is performed, and then, all the nested lithium ion batteries in the battery pack unit are connected in series; and the first current output pole is connected and conducted to the second current busbar of $D_1$, and the second current output pole is connected and conducted to the first current busbar of $D_{M \times N}$.

Further improvement lies in that if the electrodes of the outer cell upper pole piece and the inner cell upper pole piece of each of the nested lithium ion batteries are the same, the outer cell is connected in parallel with the inner cell by the shell:
the inner cell electrode caps of all the nested lithium ion batteries in each of the battery pack units are connected into a whole by a first current busbar, the outer cell electrode caps of all the nested lithium ion batteries are connected into a whole by a second current busbar, and shells of all the nested lithium ion batteries in the battery pack unit are connected and conducted to a third current busbar:
1) if the first current busbar and the first current output pole are connected and conducted as a pole, and a third current output pole and the third current busbar are connected and conducted as the other pole, the inner cells of all the nested lithium ion batteries in the battery pack unit work after being connected in parallel;
2) if the second current busbar and the second current output pole are connected and conducted as a pole, and the third current output pole and the third current busbar are connected and conducted as the other pole, the outer cells of all the nested lithium ion batteries in the battery pack unit work after being connected in parallel; and 3) if the first current output pole and the second current output pole are connected and conducted as a pole, and the third current output pole and the third current busbar are connected and conducted as the other pole, all the nested lithium ion batteries in the battery pack unit work after being connected in parallel.

Further improvement lies in that in each of the battery pack units, a second gap is formed between every two adjacent nested lithium ion batteries, and a water-cooling pipeline is distributed in an S shape in the second gap between the nested lithium ion batteries; and a via hole is formed in the edge of the positioning and connecting plate on each layer, and the water-cooling pipelines on adjacent layers penetrate through the corresponding via holes to communicate into a whole.

Further improvement lies in that the first gaps corresponding to K layers of battery pack units are connected up and down to form an air duct, fans are arranged above the battery pack unit on the uppermost layer and below the lowermost battery pack, and a temperature sensor is arranged on an air outlet of the air duct.

Further improvement lies in that the gap between the side wall of the inner cylinder and the secondary outer wall of the outer cylinder of each of the nested lithium ion batteries is filled with a heat conducting material. When each of the nested lithium ion batteries is used in a low-temperature environment, firstly, the inner cell is enabled to work, the outer cell is heated by heat generated by the inner cell in working, and the outer cell and the inner cell are started at the same time after the overall temperature is raised to a normal working state, so that the temperature of the battery can be adjusted in various manners.

Compared with the prior art, the present invention has the beneficial effects.

1. In the present invention, the cell of each of the lithium ion batteries is divided into two parts, that is, the outer cell and the inner cell between which a clearance is remained, and therefore, firstly, the overall thickness of the single cell is kept constant or is not increased significantly under the condition that the diameter of the lithium ion battery is increased, and then, the defect that heat in the center is difficult to dissipate when the battery works is overcome.

2. In the present application, there are three wiring areas in each of the lithium ion batteries, so that there can be various choices for the working state of the cell of the battery, and the serial/parallel connection between the outer cell and the inner cell can be achieved by changing a manner of connection among the positive and negative poles of the cell, the shell of the battery and the electrode caps. In addition, the outer cell and the inner cell which are separated can intermittently work, so that heat generation of the battery only occurs to one of the outer cell and the inner cell, and the other one can be used for partial heat dissipation. In a low-temperature environment, the inner cell firstly works to generate heat by which the outer cell is heated, so that the heating efficiency is higher, the heating is more uniform, and no additional heating device is required.

3. The battery is divided into the two cells between which the gap is formed, and after the battery is acted by an external mechanical force, there is a collapse space in the battery to allow deformation, thereby counteracting external mechanical damage and protecting the safety of the overall battery pack.

4. By adopting reasonable air duct design and grouping solutions based on characteristics of the nested lithium ion batteries, the temperature of each of the batteries can be detected on the premise that the number of the temperature sensors is controlled as much as possible, so that the temperature monitoring reliability and fineness are improved.

5. A connecting structural member formed by combining plastic and metal which are integrally formed is used to connect the batteries and the circuit, thereby achieving various effects such as battery fixation, circuit connection, temperature detection and air duct formation and enhancing the integration level and stability of the battery pack.

6. The heat management performance enhanced lithium ion battery pack based on the nested lithium ion batteries achieves higher heat dissipation performance and overall safety. For the battery pack based on such a special design, a water-cooling and air-cooling mixed heat dissipation system is designed on the premise that the energy density of the battery pack is not excessively affected by the structures and appearances of such batteries, and by virtue of a battery positioning plate and a battery pack housing which are specially designed, the water-cooling and air-cooling mixed heat dissipation system has the comprehensive performances such as battery fixation, circuit connection, air duct formation, temperature detection and structural strengthening at the same time. For a battery pack in a low-temperature environment, by adopting a battery self-heating system which is specially designed according to the characteristics of the batteries on the premise that the energy density performances of the batteries are not excessively affected, it is possible that a heating device is not required in the battery pack, the integration level inside the battery pack is improved, and the heating uniformity and efficiency are guaranteed.

DETAILED DESCRIPTION OF THE INVENTION

The technical solutions in the embodiments of the present invention will be described clearly and completely below in combination with the accompanying drawings in the embodiments of the present invention.

First Embodiment

As shown in FIG. 1 to FIG. 8, provided is a heat management safety enhanced battery pack based on nested lithium ion batteries, including an insulating housing 200, wherein K insulating positioning and connecting plates 300 are arranged in the insulating housing along a vertical direction, and the adjacent positioning and connecting plates are arranged in parallel and at equal intervals; the positioning and connecting plate 300 on each layer is provided with nested lithium ion 100 in M rows and N columns to form a lithium ion battery matrix in which the M×N lithium ion batteries are connected in series or in parallel to form battery pack units; the battery pack units on all layers are capable of performing output alone or performing output after being connected in series or in parallel to form a battery pack, wherein K, M and N are all positive integers greater than or equal to 2.

In the present embodiment, 4 layers of positioning and connecting plates are arranged in the insulating housing 200, and the positioning and connecting plate 300 on each layer is provided with 12 nested lithium ion batteries 100 in 3 rows and 4 columns. In other embodiments, the number of the positioning and connecting plates and the number of the nested lithium ion batteries in each of the battery pack units can be determined according to specific requirements.

Figure 2:
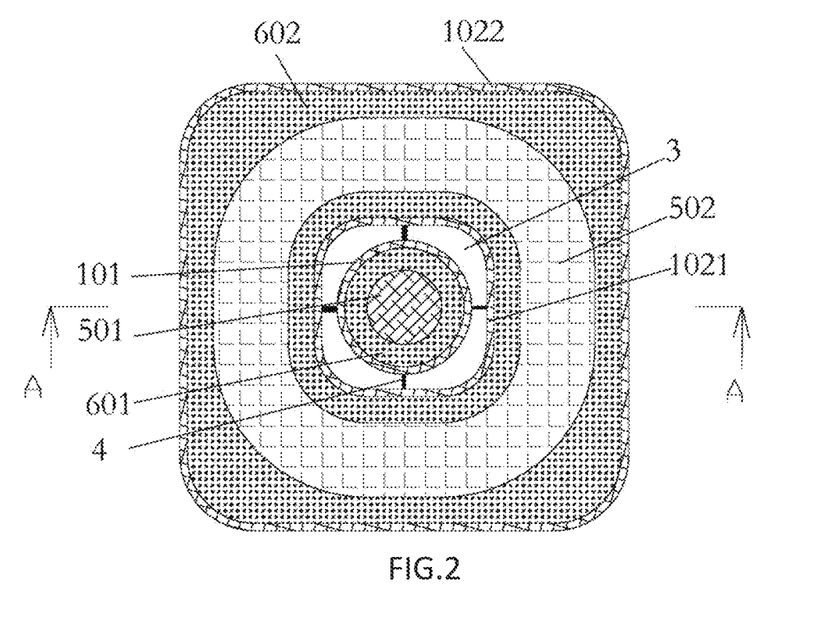
FIG. 2 is a top view of nested lithium ion batteries in the first embodiment.
Figure 3:
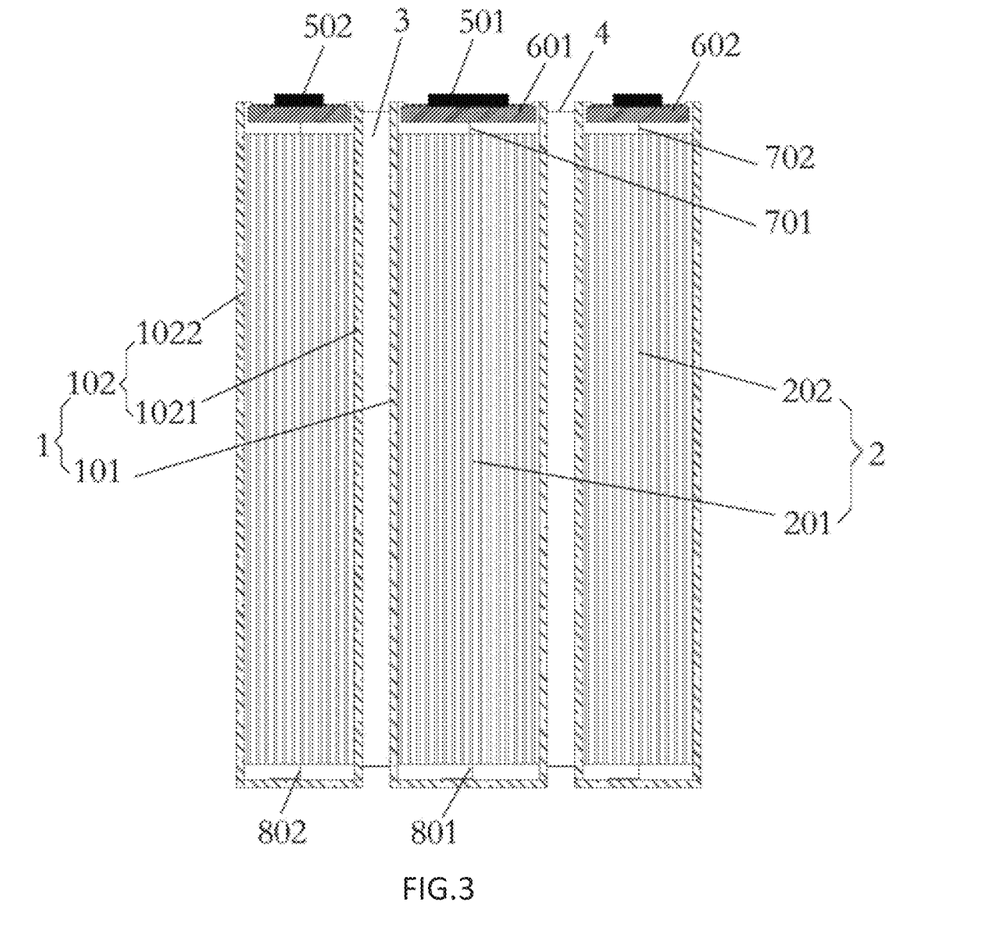
FIG. 3 is a cross-sectional view taken along a line A-A in FIG. 2.

As shown in FIG. 2 and FIG. 3, each of the nested lithium ion batteries 100 includes a metal shell 1 a cell 2 filled in the shell; the shell 1 includes an inner cylinder 101 and an outer cylinder 102 with each being of a cylindrical structure with a bottom and without a cover, wherein the outer cylinder 102 includes an outer wall 1022 and a secondary outer wall 1021, an end surface of the outer cylinder 102 is annular, the inner cylinder 101 is located in a through hole in the center of the outer cylinder 102, a first gap 3 is formed between a side wall of the inner cylinder 101 and the secondary outer wall 1021 of the outer cylinder, and the inside of the first gap 3 is provided with a metal connecting rib 4 by which the inner 101 and the outer cylinder 102 are fixedly connected into a whole and are conducted.

The cell 2 includes an outer cell 202 and an inner cell 201, the outer cell 202 is filled into an annular cavity of the outer cylinder 102, and the inner cell 201 is filled in a cavity of the inner cylinder 101; the lower end of the outer cell 202 is connected and conducted to a bottom plate of the outer cylinder 102 by an outer cell lower pole piece 802; a first battery protection assembly 602 is arranged at an opening in the upper end of the outer cylinder 102, the upper end of the outer cell 202 is connected and conducted, by an outer cell upper pole piece 702, to an outer cell electrode cap 502 arranged on the upper surface of the first battery protection assembly 602, and the outer cell electrode cap 502 is annular; the lower end of the inner cell 201 is connected and conducted to a bottom plate of the inner cylinder 101 by an inner cell lower pole piece 801; and a second battery protection assembly 601 is arranged at an opening in the upper end of the inner cylinder 101, and the upper end of the inner cell 201 is connected and conducted, by an inner cell upper pole piece 701, to an inner cell electrode cap 501 arranged on the upper surface of the second battery protection assembly 601. The first battery protection assembly and the second battery protection assembly are not connected and are two independent insulating assemblies. In the present application, the shell of each of the lithium ion batteries is designed to be of an internal and external nested structure, the gap is formed between the inner cylinder and the outer cylinder, but the inner cylinder and the outer cylinder are connected by a metal connecting rib plate which is integrated with the housing, thereby still forming a whole substantially. The outer cell and the inner cell are conducted by the metal shell, and therefore, the two cells can be connected in series or in parallel by changing manners of connection between the positive and negative poles of the outer cell and the inner cell and the shell.

By adopting such an internal and external nested structure, the geometric dimension of a single lithium ion battery may be further increased, so that the overall energy density of the battery pack is increased. Although the inside of such a nested lithium ion battery is divided into the two cells, the outer cell and the inner cell are connected and conducted by the housing instead of other external assemblies. By using such a structure, on one hand, it is convenient to connect the outer cell and the inner cell, and on the other hand, the outer cell and the inner cell are in separable and combinable working states, so that choices for assembling the battery pack are increased.

The cell of each of the lithium ion batteries relates to the present invention is a common winding cell, a structure of a protection device for a battery is similar to a structure of a safety protection device for a common cylindrical lithium ion battery, except that the shape is changed according to requirements of the nested batteries related to the present invention.

In the present embodiment, the inner cylinder 101, the outer cylinder 102 and the metal connecting rib plate 4 are integrally formed, and therefore, the structural stability is good.

Figure 1:
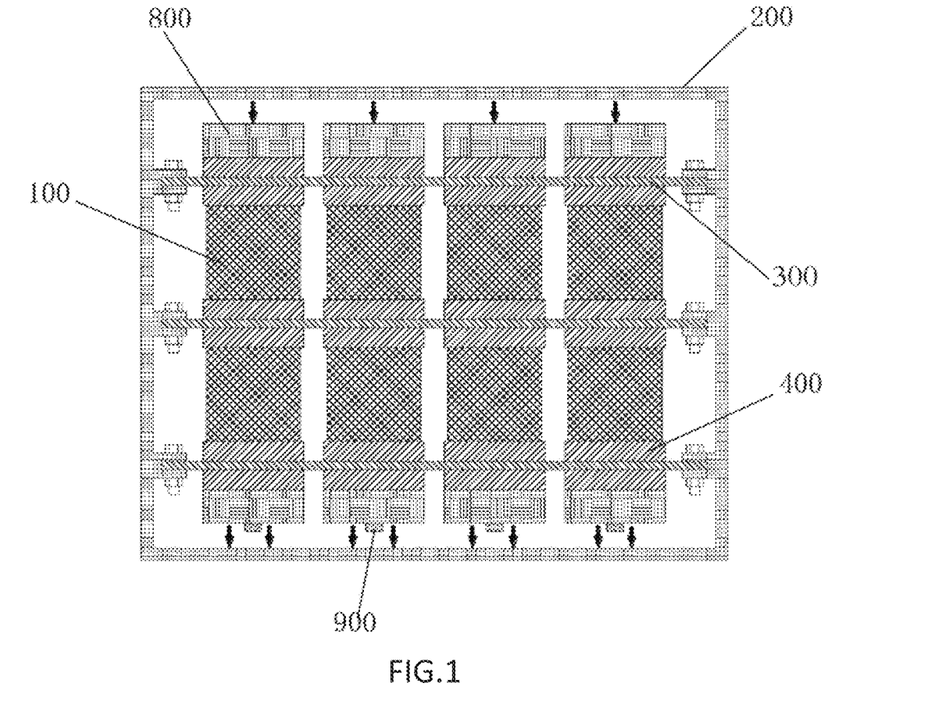
FIG. 1 is a front view of a battery pack in a first embodiment of the present invention, wherein water-cooling pipelines are not shown.

In the present embodiment, the outer cylinder is cubic, with ridges being filleted, and the inner cylinder is cylindrical, that is, the end surface is of a circular ring, as shown in FIG. 1.

Figure 6:
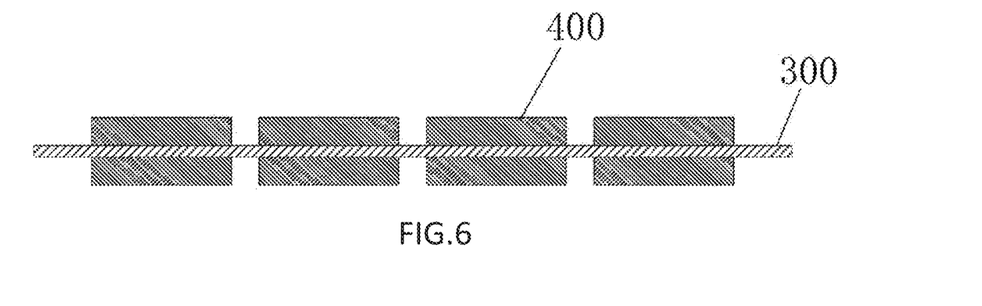
FIG. 6 is a schematic diagram showing the connection of the positioning and connecting plate and insulating limiting sleeves.

In the present embodiment, 12 first through holes are formed in each of the positioning and connecting plates 300, an insulating limiting sleeve 400 is nested into each of the first through holes, as shown in FIG. 6, each of the nested lithium ion batteries 100 is snapped in a corresponding limiting sleeve 400; and an insulating isolation pad 500 is arranged between the battery pack units on every two adjacent layers to avoid potential safety hazards and an electromagnetic compatibility problem which are caused by direct contact between electric poles of the batteries.

Figure 14:
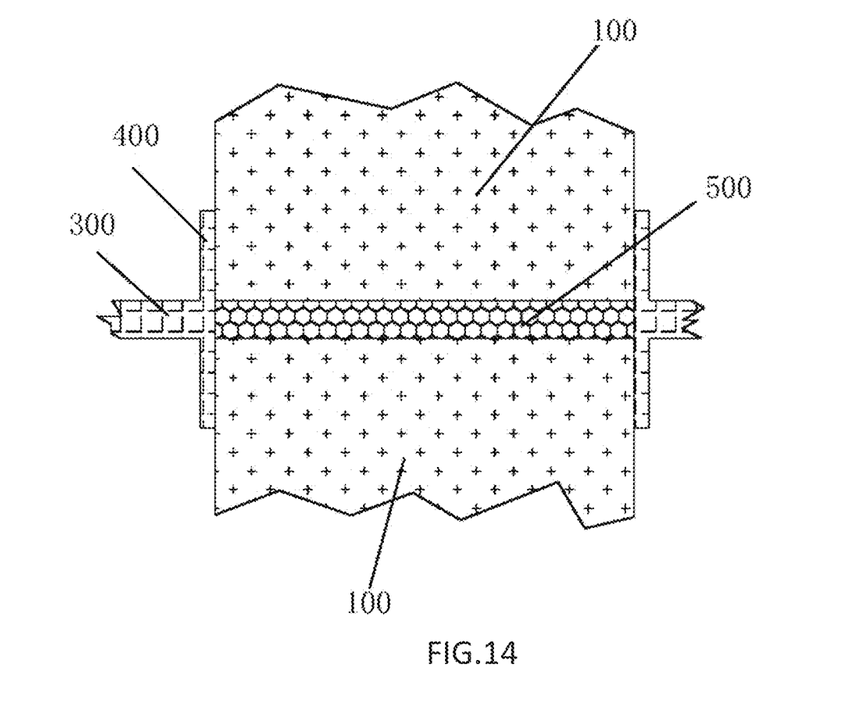
FIG. 14 is a partial enlarged view showing the assembly of the positioning and connecting plate and the insulating limiting sleeves of the nested lithium ion batteries.

The upper end of each of the nested lithium ion batteries nested in the lower part of the previous insulating limiting sleeve on the positioning and connecting plate on the present layer; and meanwhile, the lower end of the nested lithium ion battery is nested in the upper part of the previous insulating limiting sleeve on the positioning and connecting plate on the next layer, that is, the upper and lower ends of the two nested lithium ion batteries on different layers share the same insulating limiting sleeve, and the insulating isolation pad 500 is located between the upper and lower two nested lithium ion batteries, as shown in FIG. 14.

Figure 7:
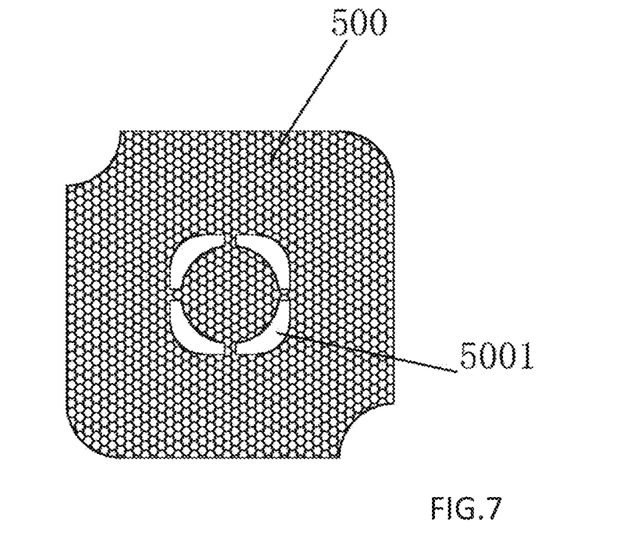
FIG. 7 is a schematic diagram showing a structure of an insulating isolation pad.

For making the insulating isolation pad 500 adapted to the nested lithium ion battery 100 and the positioning and connecting plate 300 in shape to facilitate adaptation, a clearance 5001 is reserved on a position, corresponding to a gap in the nested lithium ion battery, on the insulating isolation pad, so that the continuity of the air duct is guaranteed. However, a circular plate on a central position can still play an isolation role, as shown in FIG. 7.

In the present embodiment, 8 limiting parts 600 are fixedly arranged on the inner wall of the insulating housing, and the limiting parts are distributed, with every two forming a group, on the two opposite side walls of the insulating housing 200.

Figure 5:
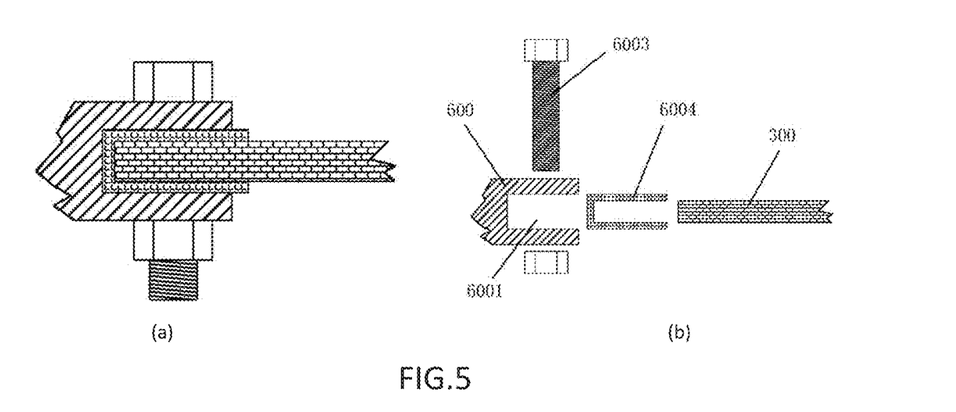
FIG. 5 is a partial schematic diagram showing a junction of an insulating shell and a positioning and connecting plate; wherein 5(a) is a schematic diagram showing assembly, and 5(b) is an exploded view.

A groove 6001 is formed in each of the limiting parts 600 along a length direction, and two ends of each of the positioning and connecting plates are snapped in the grooves of the corresponding group of limiting parts; and a flexible buffering cushion 6004 which is fixedly arranged is laid in the groove to wrap ends of the positioning and connecting plate 300, as shown in FIG. 5(*a*) and FIG. 5(*b*). A plurality of second through holes are formed in each of the limiting parts 600, a plurality of third through holes 3001 are formed in two ends of each of the positioning and connecting plates 300, each of the second through holes and a corresponding third through hole are coaxially arranged, and each bolt 6003 is inserted into a corresponding group of second through hole and third through hole and is connected with a nut to fasten the positioning and connecting plate and the corresponding limiting part, so that disassembly and assembly are convenient to achieve.

Figure 4:
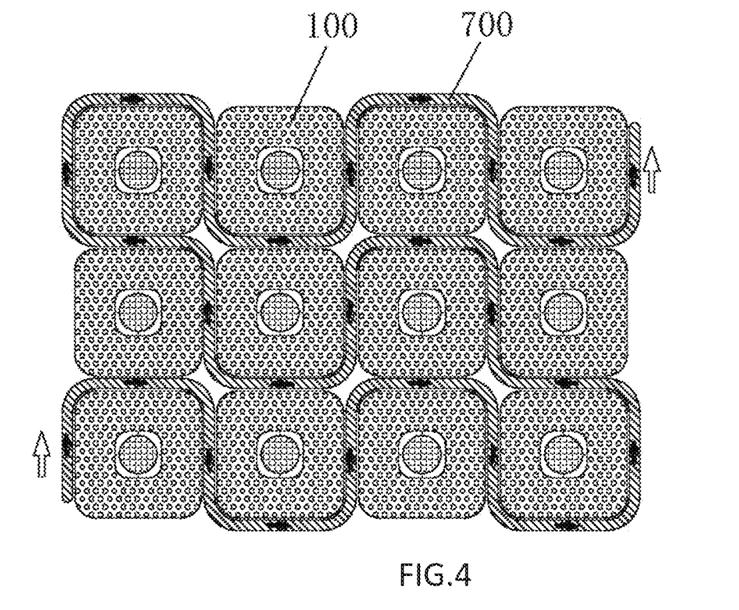
FIG. 4 is a schematic diagram showing a water-cooling pipeline of a battery pack unit in the first embodiment.

In the present embodiment, as shown in FIG. 4, in each of the battery pack units, a second gap is formed between every two adjacent nested lithium ion batteries, and a water-cooling pipeline 700 is distributed in an S shape in the second gap between the nested lithium ion batteries, in this way, the periphery of the nested lithium ion battery in the center is in full contact with the water-cooling pipelines, and flow directions of cooling liquids in the water-cooling pipelines in contact with two opposite sides of each of the nested lithium ion batteries are opposite, so that the temperature distribution inside the battery pack is more uniform, and the water-cooling heat dissipation effect and uniformity are improved. A via hole 3002 is formed in the edge of the positioning and connecting plate on each layer, and the water-cooling pipelines on adjacent layers penetrate through the corresponding via holes to communicate into a whole. Junctions of the water-cooling pipelines 700 on different layers are connected by straight pipes with the same material and internal dimension, in this way, the water-cooling pipelines may be connected among different layers under the condition that the housing of the battery pack is not changed, and a space for assembling a water inlet and a water outlet of the water-cooling pipelines is reserved in the housing of the battery pack. Arrows in the figure represent the flow directions of the cooling liquids.

In the present embodiment, the first gaps corresponding to 4 layers of battery pack units are connected up and down to form an air duct, fans 800 are arranged above the battery pack unit on the fourth layer and below the battery pack on the lowest layer, and a temperature sensor 900 is arranged on an air outlet of the air duct. The temperature sensor detects a temperature value of air blown from the air duct in real time and transmits the temperature value to a controller. When the detected temperature is higher than a set value, the controller controls the fans and water cooling to further work for cooling strengthening. The housing is provided with an air inlet and an air outlet, thereby facilitating air circulation.

A heat dissipation system for the battery pack in the present embodiment is a water-cooling and air-cooling combined heat dissipation system, air cooling means that heat inside the inner cell and the outer cell is dissipated by convection, and water cooling means that heat outside the cell is dissipated by heat conduction, and the two heat dissipation manners can be started at the same time or alone. Air-cooling heat dissipation may be started firstly, and then, water-cooling heat dissipation is started when it is detected by the temperature sensor that the temperature in the air duct is raised to a certain temperature, so that the temperature of the battery pack is controlled, a better heat dissipation effect is achieved, and the energy consumption is reduced as much as possible.

In the present embodiment, if electrodes of the outer cell upper pole piece 702 and the inner cell upper pole piece 701 of each of the nested lithium ion batteries 100 are different, the outer cell upper pole piece is a positive pole, the inner cell upper pole piece is a negative pole, the inner cell lower pole piece is a positive pole, and the outer cell lower pole piece is a negative pole, the outer cell is connected in series with the inner cell by the shell of the battery, the inner cell electrode cap is the negative pole of a battery, and the outer cell electrode cap is the positive pole of the battery.

Or, if the electrodes of the outer cell upper pole piece and the inner cell upper pole piece are different, the outer cell upper pole piece is a negative pole, the inner cell upper pole piece is a positive pole, the inner cell lower pole piece is a negative pole, and the outer cell lower pole piece is a positive pole, the outer cell is connected in series with the inner cell by the shell of the battery, the inner cell electrode cap is the positive pole of a battery, and the outer cell electrode cap is the negative pole of the battery.

Figure 8:
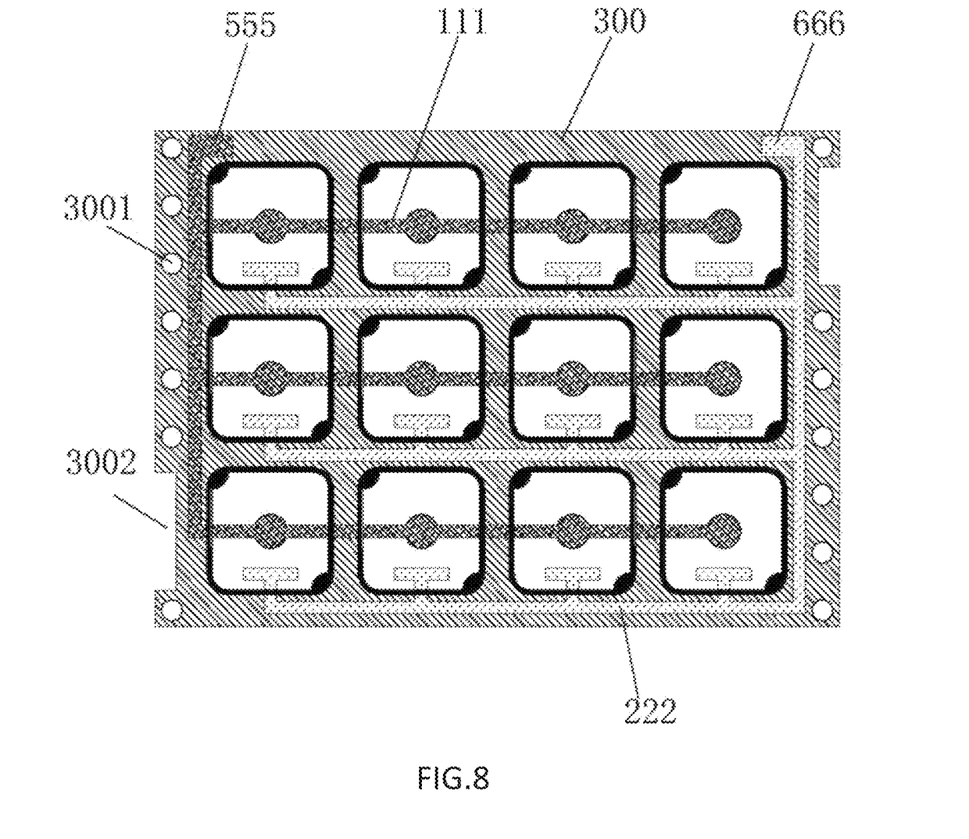
FIG. 8 is a schematic diagram showing that all the nested lithium ion batteries on each layer are connected in parallel to form a battery pack unit in the first embodiment.

1) The inner cell electrode caps 501 of the 12 nested lithium ion batteries 100 in each of the battery pack units are connected into a whole by a first current busbar 111, the outer cell electrode caps 502 of the 12 nested lithium ion batteries are connected into a whole by a second current busbar 222, and then, the 12 nested lithium ion batteries in the battery pack unit are connected in parallel, and the two output poles are a first current output pole 555 and a second current output pole 666, as shown in FIG. 8.

Figure 9:
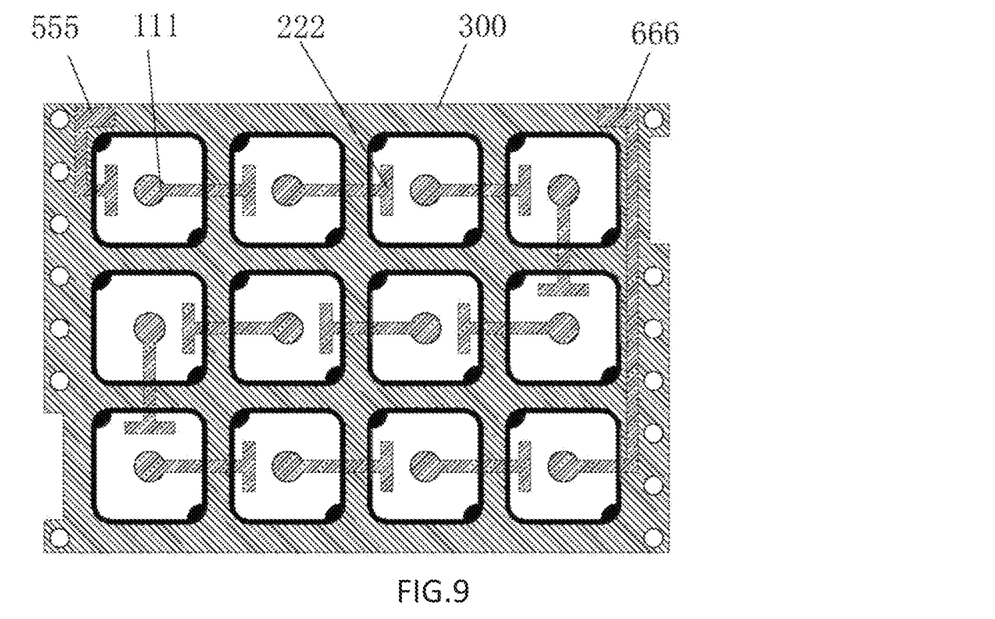
FIG. 9 is a schematic diagram showing that all the nested lithium ion batteries on each layer are connected in series to form a battery pack unit in the first embodiment.

2) All the nested lithium ion batteries in each of the battery pack units are successively marked as $D_1$, $D_2$, $D_3$, $D_4$, $D_5$, . . . , $D_{M \times N-1}$ and $D_{M \times N}$ according to an arrangement order of the matrix, wherein the inner cell electrode cap of each of the nested lithium ion batteries is connected with one of the first current busbars, and the outer cell electrode cap thereof is connected with one of the second current busbars;

then, the first current busbar of $D_1$ is connected and conducted to the second current busbar of $D_2$; the first current busbar of $D_2$ is connected and conducted to the second current busbar of $D_3$; the first current busbar of $D_3$ is connected and conducted to the second current busbar of $D_4$; the first current busbar of $D_4$ is connected and conducted to the second current busbar of $D_5$; successive connection is performed, and then, all the nested lithium ion batteries in the battery pack unit are connected in series; and the first current output pole 555 is connected and conducted to the second current busbar of $D_1$, and the second current output pole 666 is connected and conducted to the first current busbar of $D_{M \times N}$, as shown in FIG. 9.

Second Embodiment

In the present embodiment, the electrodes of the outer cell upper pole piece 702 and the inner cell upper pole piece 701 of each of the nested lithium ion batteries 100 are the same and are positive electrodes at the same time; and the inner cell lower pole piece 801 and the outer cell lower pole piece 802 are conducted to the housing and are negative poles at the same time, and the outer cell is connected in parallel with the inner cell by the shell.

In other embodiments, the electrodes of the outer cell upper pole piece and the inner cell upper pole piece are the same and may be negative poles at the same time; and the inner cell lower pole piece and the outer cell lower pole piece are conducted to the housing and are positive poles at the same time.

Figure 10:
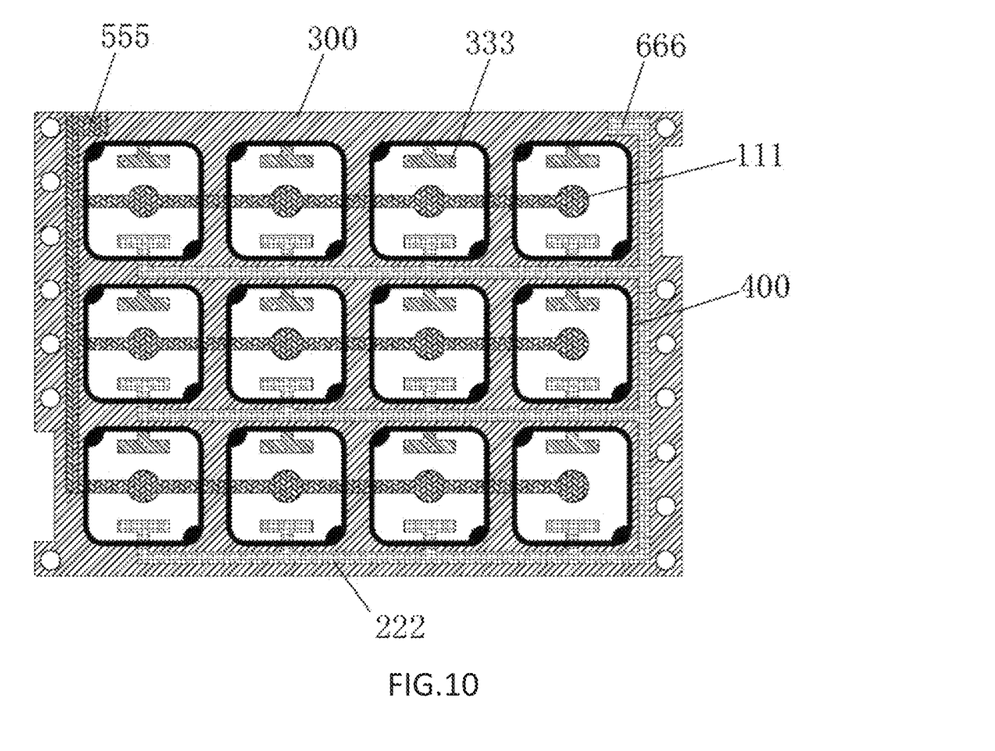
FIG. 10 is a top view of a positioning and connecting plate and insulating limiting sleeves when insulating isolation pads have not been laid and nested lithium ion batteries have not been loaded in a second embodiment.
Figure 11:
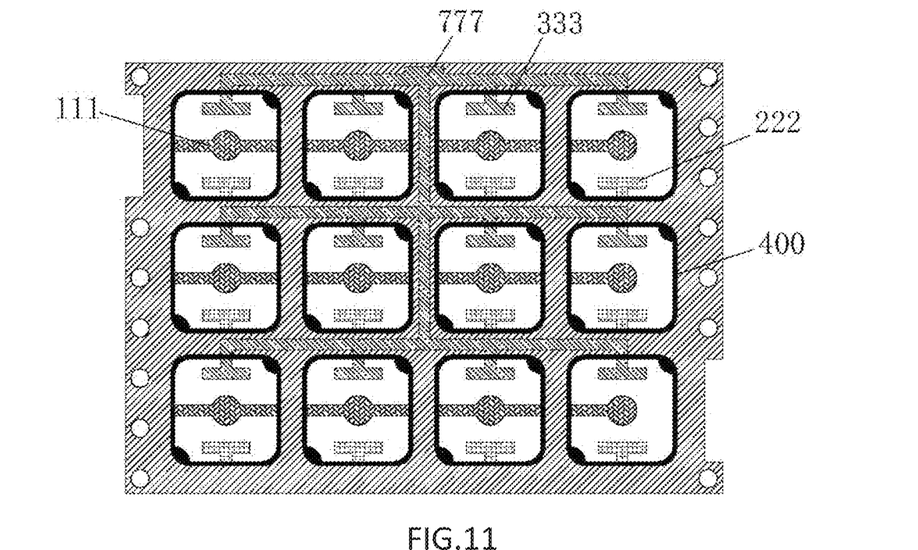
FIG. 11 is a bottom view of the positioning and connecting plate and the insulating limiting sleeves when the insulating isolation pads have not been laid and the nested lithium ion batteries have not been loaded in the second embodiment.
Figure 12:
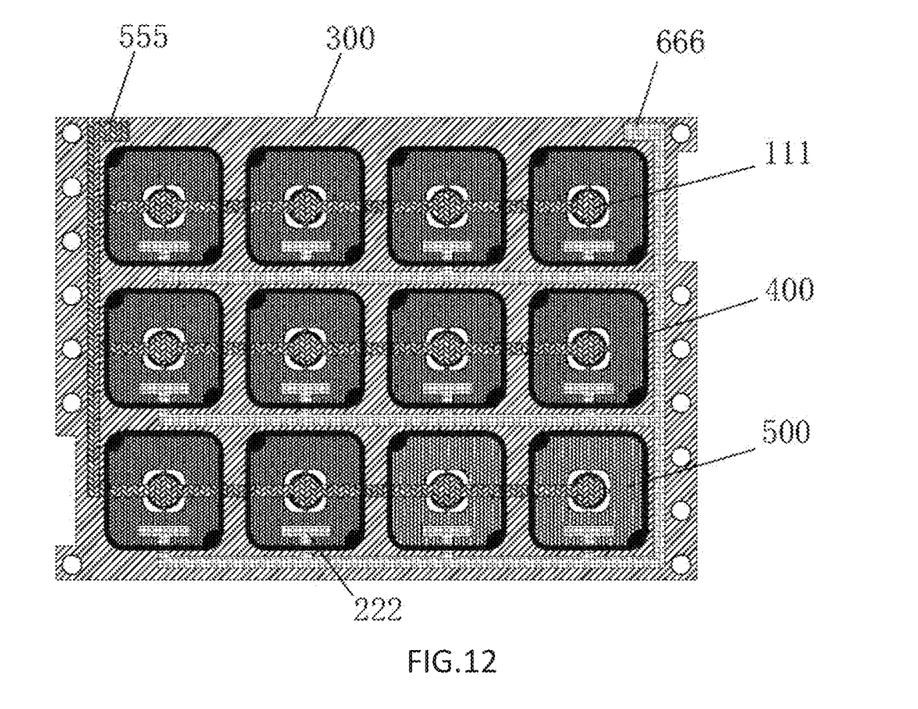
FIG. 12 is a top view of the positioning and connecting plate and the insulating limiting sleeves when the insulating isolation pads have been laid and the nested lithium ion batteries have not been loaded in the second embodiment.
Figure 13:
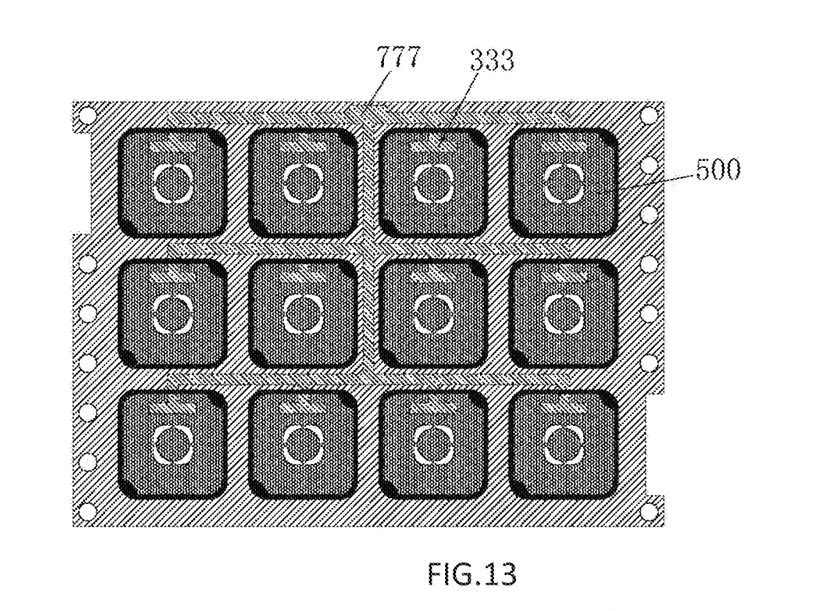
FIG. 13 is a bottom view of the positioning and connecting plate and the insulating limiting sleeves when the insulating isolation pads have been laid and the nested lithium ion batteries have not been loaded in the second embodiment.

In the present embodiment, the inner cell electrode caps of all the nested lithium ion batteries in each of the battery pack units are connected into a whole by a first current busbar, the outer cell electrode caps of all the nested lithium ion batteries are connected into a whole by a second current busbar, and shells of all the nested lithium ion batteries in the battery pack unit are connected by a third current busbar. The first current busbar 111, the second current busbar 222 and the third current busbar 333 are fixedly arranged on the positioning and connecting plate 300, one end of each of the first current busbar 111, the second current busbar 222 and the third current busbar 333 is correspondingly connected and conducted to the first current output pole 555, the second current output pole 666 and a third current output pole 777, and the other ends thereof penetrate through the side walls of the corresponding insulating limiting sleeves 400 to enter the cavities of the insulating limiting sleeves 400.

Wherein the first current busbar 111, the second current busbar 222, the first current output pole 555 and the second current output pole 666 are fixedly arranged on the upper surface of the corresponding positioning and connecting plate 300, as shown in FIG. 10 and FIG. 12; and the third current busbar 333 and the third current output pole 777 are fixedly arranged on the lower surface of the corresponding positioning and connecting plate 300, as shown in FIG. 11 and FIG. 13, so that short circuit caused by circuit crossover is avoided.

Specifically, as shown in FIG. 10 to FIG. 13, wherein FIG. 10 is a top view of a positioning and connecting plate 300 and insulating limiting sleeves 400 when insulating isolation pads 500 have not been laid and nested lithium ion batteries 100 have not been loaded, that is, a diagram showing an upper surface of the positioning and connecting plate. FIG. 11 is a bottom view of the positioning and connecting plate 300 and the insulating limiting sleeves 400 when the insulating isolation pads 500 have not been laid and the nested lithium ion batteries 100 have not been loaded, that is, a diagram showing a lower surface of the positioning and connecting plate. FIG. 12 is a top view of the positioning and connecting plate 300 and the insulating limiting sleeves 400 when the insulating isolation pads 500 have been laid and the nested lithium ion batteries 100 have not been loaded, that is, a diagram showing the upper surface of the positioning and connecting plate. FIG. 13 is a bottom view of the positioning and connecting plate 300 and the insulating limiting sleeves 400 when the insulating isolation pads 500 have been laid and the nested lithium ion batteries 100 have not been loaded, that is, a diagram showing the lower surface of the positioning and connecting plate. By performing comparison whether the insulating isolation pads are laid or not, clearer display is enabled, thereby facilitating the understanding.

Figure 15:
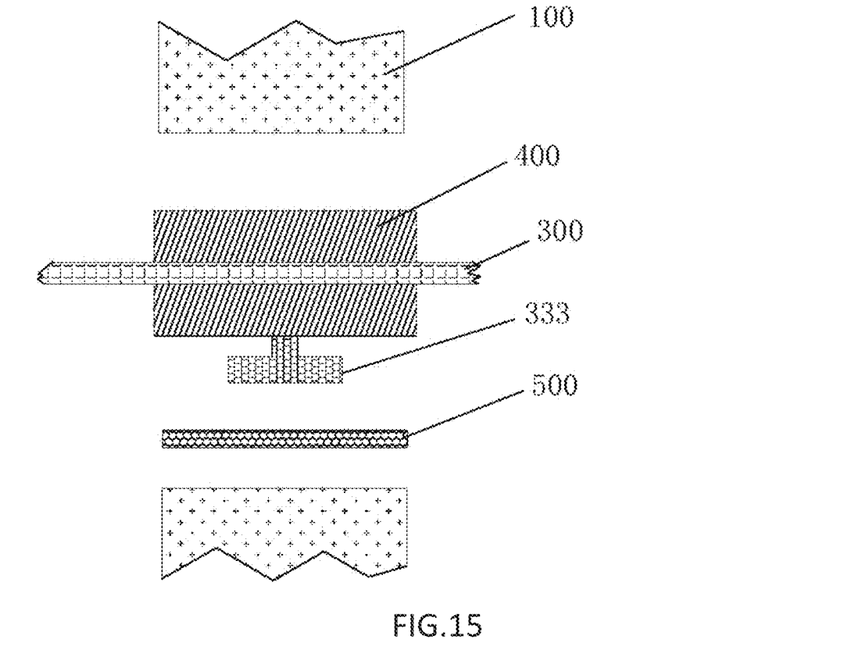
FIG. 15 is an exploded view of FIG. 14.

The third current busbar 333 fixedly arranged on the positioning and connecting plate 300 outwards extends along the inner wall of the insulating limiting sleeve and extends out of the insulating limiting sleeve after being bent. For facilitating operation, the third current busbar 333 is enabled to be in good contact and conduction to the shell of the corresponding nested lithium ion battery 100, as shown in FIG. 15.

At the moment, each of the battery pack units works in one of the following three working states.

1) If the first current busbar 111 and the first current output pole 555 are connected and conducted as a pole, and the third current output pole 777 and the third current busbar 333 are connected and conducted as the other pole, the inner cells of all the nested lithium ion batteries 100 in the battery pack unit work after being connected in parallel. At the moment, the air-cooling heat dissipation is only started, water-cooling heat dissipation is not started, and when it is detected by the temperature sensor that the temperature reaches a certain temperature, the air-cooling heat dissipation strength is increased to strengthen heat dissipation.

2) If the second current busbar 222 and the second current output pole 666 are connected and conducted as a pole, and the third current output pole 777 and the third current busbar 333 are connected and conducted as the other pole, the outer cells of all the nested lithium ion batteries 100 in the battery pack unit work after being connected in parallel. At the moment, the air-cooling heat dissipation and the water-cooling heat dissipation are both started, and when it is detected by the temperature sensor that the temperature reaches a certain temperature, the water-cooling heat dissipation strength is increased to strengthen heat dissipation.

3) If the first current output pole 555 and the second current output pole 666 are connected and conducted as a pole, and the third current output pole 777 and the third current busbar 333 are connected and conducted as the other pole, all the nested lithium ion batteries 100 in the battery pack unit work after being connected in parallel. Other parts are the same as those in the first embodiment.

Third Embodiment

Figure 16:
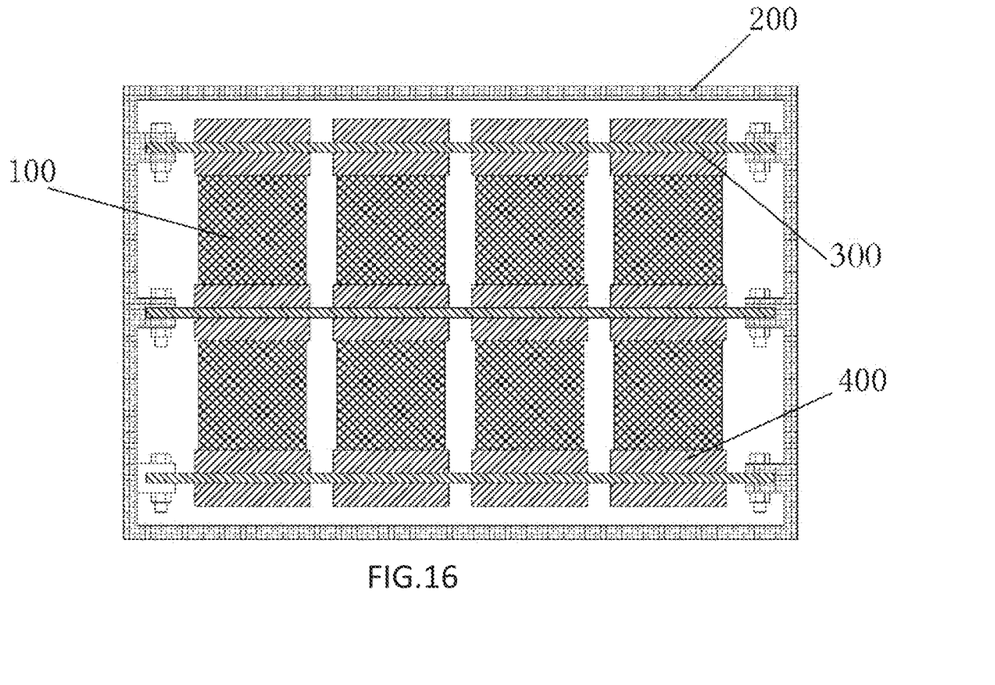
FIG. 16 is a front view of a battery pack in a third embodiment of the present invention.
Figure 17:
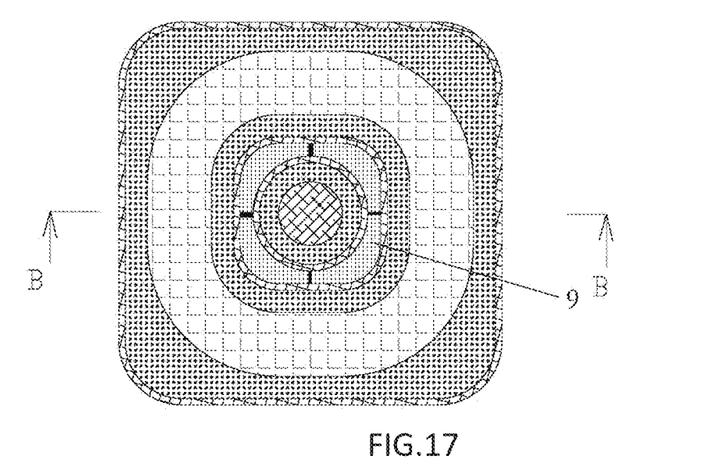
FIG. 17 is a top view of nested lithium ion batteries in the third embodiment of the present invention.
Figure 18:
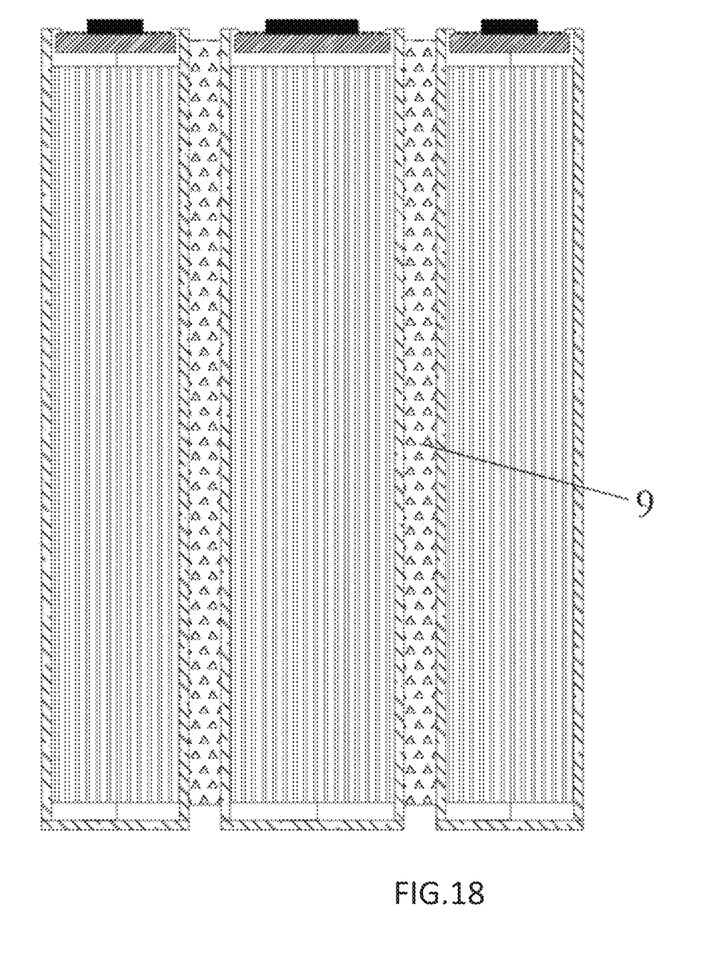
FIG. 18 is a cross-sectional view taken along a line B-B in FIG. 17.

In the present embodiment, as shown in FIG. 16 to FIG. 18, the gap 3 between the side wall of the inner cylinder and the secondary outer wall of the outer cylinder of each of the nested lithium ion batteries is filled with a heat conducting material 9. The heat conducting material 9 is filled for the purpose of conducting the heat between the outer cell and the inner cell. Such a battery is not suitable for assembly in a battery pack often working in a high-temperature environment, but is very suitable for assembly in a battery pack often working in a low-temperature environment.

In the low-temperature environment, if the battery is overlow in temperature when being started, the performances of the battery will be lowered obviously, the defects of shortening the life of the battery and lowering the stability of the battery will be easily caused within a long time, and therefore, a use strategy of the nested battery is different from that of a common lithium ion battery in the low-temperature environment. When the battery is started, the inner cell 201 is only used to work, so that the working current of the cell in a unit volume is higher, and the inner cell generates obvious heat; and the inner cell 201 is wrapped by the heat conducting material 9, most of the generated heat is conducted to the outer cell 202 by the heat conducting material 9 to heat the outer cell 202, after the temperature of the outer cell 202 is raised to a normal working temperature, the outer cell 202 is used to work, the work of the inner cell 201 is paused, or the two cells work at the same time, so that the temperature of the battery can be adjusted in various manners. The heat using efficiency of such a nested battery is high, and the battery pack can be heated without an additional heating device.

In the present embodiment, no fans are arranged in the insulating housing 200, as shown in FIG. 16.

Other parts are the same as those in the first embodiment.

In the present embodiment, if the electrodes of the outer cell upper pole piece and the inner cell upper pole piece of each of the nested lithium ion batteries are the same, the outer cell is connected in parallel with the inner cell by the shell; the inner cell electrode caps of all the nested lithium ion batteries in each of the battery pack units are connected into a whole by a first current busbar, the outer cell electrode caps of all the nested lithium ion batteries are connected into a whole by a second current busbar, and shells of all the nested lithium ion batteries in the battery pack unit are connected into a whole by a third current busbar; wherein the first current busbar, the second current busbar, the first current output pole and the second current output pole are located on the upper surface of the positioning and connecting plate, and the third current busbar and the third current output pole are located on the lower surface of the positioning and connecting plate, so that short circuit caused by circuit crossover is avoided.

When the battery is started at low temperature, firstly, the first current busbar and the first current output pole are connected and conducted as a pole, and the third current output pole and the third current busbar are connected and conducted as the other pole, the inner cells of all the nested lithium ion batteries in the battery pack unit work after being connected in parallel. The current is larger, the inner cell is capable of rapidly generating heat, and the heat is conduced by the heat conducting material 9 to rapidly heat the outer cell, so that the temperature of the outer cell is rapidly raised to a normal working temperature. Moreover, in this process, the inner cell is completely not in contact with the water-cooling pipeline, and therefore, less heat is escaped.

When the temperature of the outer cell is raised to be close to the normal working temperature, the working state of the battery pack is switched, at the moment, the first current output pole and the second current output pole are connected and conducted as a pole, and the third current output pole and the third current busbar are connected and conducted as the other pole, the outer cells of all the nested lithium ion batteries in the battery pack unit work after being connected in parallel. Or the working state may also be switched into the working state that the second current busbar and the second current output pole are connected and conducted as a pole, and the third current output pole and the third current busbar are connected and conducted as the other pole, the outer cells of all the nested lithium ion batteries in the battery pack unit work after being connected in parallel, so that the inner cells are made to take a rest.

It should be understood that the specific embodiments described herein are merely intended to explain the present invention, rather than to limit the present invention. Any modifications, equivalent replacements, improvements and the like made within the spirit and principle of the present invention shall fall within the protection scope of the present invention.

The invention claimed is:

1. A heat management safety enhanced battery pack based on nested lithium ion batteries, comprising an insulating housing, wherein K insulating positioning and connecting plates are arranged in the insulating housing along a vertical direction, and adjacent positioning and connecting plates are arranged in parallel and at equal intervals; the positioning and connecting plate on each layer is provided with nested lithium ion batteries in M rows and N columns to form a lithium ion battery matrix in which the M×N lithium ion batteries are connected in series or in parallel to form battery pack units; the battery pack units on all layers are capable of performing output alone or performing output after being connected in series or in parallel to form a battery pack, wherein K, M and N are all positive integers greater than or equal to 3;

each of the nested lithium ion batteries comprises:
a metal shell and a cell filled in the shell; the shell comprises an inner cylinder and an outer cylinder with each being of a cylindrical structure with a bottom and without a cover, wherein the outer cylinder comprises an outer wall and a secondary outer wall, an end surface of the outer cylinder is annular, the inner cylinder is located in a through hole in a center of the outer cylinder, a first gap is formed between a side wall of the inner cylinder and the secondary outer wall of the outer cylinder, and the inside of the first gap is provided with a metal connecting rib plate by which the inner cylinder and the outer cylinder are fixedly connected into a whole and are conducted; and
the cell comprises an outer cell and an inner cell, the outer cell is filled into a cavity of the outer cylinder, and the inner cell is filled in a cavity of the inner cylinder; the lower end of the outer cell is connected and conducted to a bottom plate of the outer cylinder by an outer cell lower pole piece; a first battery protection assembly is arranged at an opening in an upper end of the outer cylinder, and an upper end of the outer cell is connected and conducted, by an outer cell upper pole piece, to an outer cell electrode cap arranged on an upper surface of the first battery protection assembly; a lower end of the inner cell is connected and conducted to a bottom plate of the inner cylinder by an inner cell lower pole piece; and a second battery protection assembly is arranged at an opening in an upper end of the inner cylinder, and an upper end of the inner cell is connected and conducted, by an inner cell upper pole piece, to an inner cell electrode cap arranged on the upper surface of the second battery protection assembly.

2. The heat management safety enhanced battery pack based on nested lithium ion batteries of claim 1, wherein the inner cylinder, the outer cylinder and the metal connecting rib plate of each of the nested lithium ion batteries are integrally formed.

3. The heat management safety enhanced battery pack based on nested lithium ion batteries of claim 2, wherein the outer cylinder of each of the nested lithium ion batteries is a cylindrical shell.

4. The heat management safety enhanced battery pack based on nested lithium ion batteries of claim 3, wherein M×N first through holes are formed in each of the positioning and connecting plates, an insulating limiting sleeve is nested into each of the first through holes, and each of the nested lithium ion batteries is snapped in a corresponding limiting sleeve; and an insulating isolation pad is arranged between the battery pack units on every two adjacent layers.

5. The heat management safety enhanced battery pack based on nested lithium ion batteries of claim 4, wherein 2K limiting parts are fixedly arranged on an inner wall of the insulating housing, and the limiting parts are distributed, with every two forming a group, on two opposite side walls of the insulating housing;
- a groove is formed in each of the limiting parts along a length direction, and two ends of each of the positioning and connecting plates are snapped in the groove of a corresponding group of limiting parts; and a flexible buffering cushion is laid in the groove to wrap ends of the positioning and connecting plate; and
- a plurality of second through holes are formed in each of the limiting parts, a plurality of third through holes are formed in two ends of each of the positioning and connecting plates respectively, each of the second through holes and a corresponding third through hole are coaxially arranged, and a bolt is inserted into a corresponding group of second through hole and third through hole and is connected with a nut to fasten the positioning and connecting plate and a corresponding limiting part.

6. The heat management safety enhanced battery pack based on nested lithium ion batteries of claim 5, wherein if electrodes of the outer cell upper pole piece and the inner cell upper pole piece of each of the nested lithium ion batteries are different, the outer cell is connected in series with the inner cell by the shell:
1) inner cell electrode caps of all the nested lithium ion batteries in each of the battery pack units are connected into a whole by a first current busbar, outer cell electrode caps of all the nested lithium ion batteries are connected into a whole by a second current busbar, and then, all the nested lithium ion batteries in the battery pack units are connected in parallel; and a first current output pole is connected and conducted to the first current busbar, and a second current output pole is connected and conducted to the second current busbar; and
2) All the nested lithium ion batteries in each of the battery pack units are successively marked as $D_1$, $D_2$, $D_3$, $D_4$, $D_5$, ..., $D_{M\times N-1}$ and $D_{M\times N}$ according to an arrangement order of the lithium ion battery matrix, the inner cell electrode cap of each of the nested lithium ion batteries is connected with one of the first current busbars, and the outer cell electrode cap thereof is connected with one of the second current busbars;
then, the first current busbar of $D_1$ is connected and conducted to the second current busbar of $D_2$; the first current busbar of $D_2$ is connected and conducted to the second current busbar of $D_3$; the first current busbar of $D_3$ is connected and conducted to the second current busbar of $D_4$; the first current busbar of $D_4$ is connected and conducted to the second current busbar of $D_5$; successive connection is performed, and then, all the nested lithium ion batteries in the battery pack units are connected in series; and the first current output pole is connected and conducted to the second current busbar of $D_1$, and the second current output pole is connected and conducted to the first current busbar of $D_{M\times N}$.

7. The heat management safety enhanced battery pack based on nested lithium ion batteries of claim 6, wherein if the electrodes of the outer cell upper pole piece and the inner cell upper pole piece of each of the nested lithium ion batteries are the same, the outer cell is connected in parallel with the inner cell by the shell:
the inner cell electrode caps of all the nested lithium ion batteries in each of the battery pack units are connected into a whole by a first current busbar, the outer cell electrode caps of all the nested lithium ion batteries are connected into a whole by a second current busbar, and shells of all the nested lithium ion batteries are connected into a whole by a third current busbar:
1) If the first current busbar and the first current output pole are connected and conducted as a pole, and a third current output pole fixedly arranged on a positioning structural plate and the third current busbar are connected and conducted as the other pole, the inner cells of all the nested lithium ion batteries in the battery pack units work after being connected in parallel;
2) If the second current busbar and the second current output pole are connected and conducted as a pole, and the third current output pole and the third current busbar are connected and conducted as the other pole, the outer cells of all the nested lithium ion batteries in the battery pack units work after being connected in parallel; and
3) If the first current output pole and the second current output pole are connected and conducted as a pole, and the third current output pole and the third current busbar are connected and conducted as the other pole, all the nested lithium ion batteries in the battery pack units work after being connected in parallel.

8. The heat management safety enhanced battery pack based on nested lithium ion batteries of claim 1, wherein in each of the battery pack units, a second gap is formed between every two adjacent nested lithium ion batteries, and a water-cooling pipeline is distributed in an S shape in the second gap between the nested lithium ion batteries; and
a via hole is formed in an edge of the positioning and connecting plate on each layer, and the water-cooling pipelines on adjacent layers penetrate through a corresponding via hole to communicate into a whole.

9. The heat management safety enhanced battery pack based on nested lithium ion batteries of claim 8, wherein the first gaps corresponding to K layers of battery pack units are connected up and down to form an air duct, fans are arranged above the battery pack units on the uppermost layer and below the lowermost battery pack units, and a temperature sensor is arranged on an air outlet of the air duct.

10. The heat management safety enhanced battery pack based on nested lithium ion batteries of claim 1, wherein the gap between the side wall of the inner cylinder and the secondary outer wall of the outer cylinder of each of the nested lithium ion batteries is filled with a heat conducting material.

* * * * *